(12) United States Patent
Martin, II et al.

(10) Patent No.: US 8,396,192 B2
(45) Date of Patent: Mar. 12, 2013

(54) DESKTOP RECORDING ARCHITECTURE FOR RECORDING CALL SESSIONS OVER A TELEPHONY NETWORK

(75) Inventors: James Paul Martin, II, Vadnais Heights, MN (US); Mike Maciej, Rogers, MN (US)

(73) Assignee: Calabrio, Inc., Minneapolis, MN (US)

( * ) Notice: Subject to any disclaimer, the term of this patent is extended or adjusted under 35 U.S.C. 154(b) by 294 days.

(21) Appl. No.: 12/716,810

(22) Filed: Mar. 3, 2010

(65) Prior Publication Data
US 2011/0216896 A1 Sep. 8, 2011

(51) Int. Cl.
*H04M 1/64* (2006.01)

(52) U.S. Cl. ............... 379/85; 379/86.26; 379/112.02; 370/352

(58) Field of Classification Search ............ 379/265.06, 379/265.09; 370/352
See application file for complete search history.

(56) References Cited

U.S. PATENT DOCUMENTS

| | | | |
|---|---|---|---|
| 5,647,002 A | 7/1997 | Brunson | |
| 5,740,240 A | 4/1998 | Jolissaint | |
| 5,917,903 A | 6/1999 | Jolissaint | |
| 6,169,896 B1 | 1/2001 | Sant et al. | |
| 6,496,483 B1 | 12/2002 | Kung et al. | |
| 6,801,618 B2 | 10/2004 | Nygren et al. | |
| 6,856,618 B2 | 2/2005 | Strathmeyer et al. | |
| 6,925,499 B1 | 8/2005 | Chen et al. | |
| 7,035,847 B2 | 4/2006 | Brown et al. | |
| 7,054,420 B2 | 5/2006 | Barker et al. | |
| 7,227,930 B1 | 6/2007 | Othmer et al. | |
| 7,295,970 B1 | 11/2007 | Gorin et al. | |
| 7,386,105 B2 | 6/2008 | Wasserblat et al. | |
| 7,529,357 B1 | 5/2009 | Rae et al. | |
| 7,584,104 B2 | 9/2009 | Schroeter | |
| 7,590,229 B2 | 9/2009 | Bangor et al. | |
| 7,613,290 B2 | 11/2009 | Williams et al. | |
| 7,644,096 B2 | 1/2010 | Sjolander | |
| 7,873,035 B2 | 1/2011 | Kouretas et al. | |
| 7,899,167 B1 | 3/2011 | Rae | |
| 8,199,886 B2 | 6/2012 | Calahan et al. | |
| 8,219,404 B2 | 7/2012 | Weinberg et al. | |
| 2004/0207724 A1 | 10/2004 | Crouch et al. | |
| 2006/0274756 A1 | 12/2006 | Karia et al. | |
| 2007/0276910 A1* | 11/2007 | Deboy et al. | 709/204 |
| 2008/0056241 A1 | 3/2008 | Haddad et al. | |
| 2008/0219243 A1 | 9/2008 | Silverman | |
| 2008/0240404 A1* | 10/2008 | Conway et al. | 379/265.06 |

(Continued)

OTHER PUBLICATIONS

International Search Report and Written Opinion issued in PCT/US2010/034742, mailed Jul. 15, 2010.

(Continued)

*Primary Examiner* — Creighton Smith
(74) *Attorney, Agent, or Firm* — Faegre Baker Daniels LLP

(57) ABSTRACT

Systems and methods for recording call sessions over a telephony network using a desktop recording architecture are disclosed. An illustrative system for recording call sessions over a telephony network includes one or more user telephone stations equipped with a telephone and computer desktop, and one or more additional record services or record servers. A desktop recording service associated with the computer desktop is configured to operate as either a primary or secondary recording service for recording inbound or outbound calls conducted over the user telephone station.

28 Claims, 9 Drawing Sheets

U.S. PATENT DOCUMENTS

| | | | |
|---|---|---|---|
| 2008/0240405 A1* | 10/2008 | Conway et al. | 379/265.06 |
| 2008/0301021 A1* | 12/2008 | Kwong Hin Sang | 705/35 |
| 2009/0016522 A1 | 1/2009 | Torres et al. | |
| 2009/0034693 A1* | 2/2009 | Anderson | 379/88.01 |
| 2009/0074156 A1 | 3/2009 | Ku et al. | |
| 2009/0185673 A1 | 7/2009 | Erhart et al. | |
| 2009/0303875 A1 | 12/2009 | Matsumura | |
| 2010/0226339 A1 | 9/2010 | Stephenson et al. | |
| 2010/0316199 A1 | 12/2010 | Martin, II | |
| 2011/0235520 A1 | 9/2011 | Maciej et al. | |

OTHER PUBLICATIONS

International Search Report and Written Opinion issued in PCT/US2011/026835, mailed May 5, 2011, 14 pages.

International Search Report and Written Opinion issued in PCT/US2011/026839, mailed May 5, 2011, 12 pages.

\* cited by examiner

DESKTOP RECORDING ARCHITECTURE FOR RECORDING CALL SESSIONS OVER A TELEPHONY NETWORK

TECHNICAL FIELD

The present invention relates generally to the field of recording voice and data communications over a network. More specifically, the present invention pertains to systems and methods for recording call sessions over a telephony network using a desktop recording architecture.

BACKGROUND

The recording of voice and data communications during telephone call sessions is becoming increasingly important in certain industries, particularly where the quality of customer interactions needs to be monitored for quality assurance purposes, or where legal or security issues resulting from customer interactions need to be considered. In the financial services industry, for example, the recording of telephone calls is often necessary to ensure legal and regulatory compliance with securities laws and regulations, and to evaluate customer interactions for quality assurance purposes. In some cases, for example, a telephone conversation between a customer and a broker may need to be saved for later verification by a broker-dealer that the customer requested a particular trade or that the customer was properly informed of the risks associated with purchasing a particular investment. Other industries in which voice and data communications are routinely recorded include the healthcare industry, for documenting health advice or to resolve patient disputes, and in customer service centers for settling customer complaints and for training purposes.

The recording of voice communications over a Voice over Internet Protocol (VoIP) network is typically accomplished using a record service or record server coupled to each user's telephone employed for handling call sessions, either directly via a built-in-bridge or indirectly through a router or gateway. In real-time applications, the voice communications to be recorded are often fed to the record server as a stream of data packets using a standardized packet format such as Real-time Transport Protocol (RTP). Recording of telephone conversations can be done either automatically for each call received by the user, or selectively upon the occurrence of a certain event or condition or by a manual request received from the telephone user or from another third-party. In some customer service centers, for example, the recording of a telephone conversation between a customer and a customer service representative may be triggered manually by a request from the representative, or automatically from a software application in response to an event such as a customer complaint. In some systems, multiple record servers may be employed in a VoIP environment to provide a level of redundancy or failover protection in the event one or more of the record servers fail, experiences an overflow error or becomes unstable, is taken off-line, or otherwise becomes incapable of recording the data stream.

The use of network record servers for recording voice and data over a telephony network typically requires a large amount of bandwidth, and is often susceptible to infrastructure failures at both the network level as well as at the desktop level at the user's desktop. In some situations, the failure of a user's desktop to communicate with a communications manager operating over a telephony network can affect the recording of a single call or, in some cases, multiple calls. Network record servers also require directing massive amounts of data over a network, which can over-burden the network. This can result in a reduction in the quality of the recording and/or the failure to record a call session. In the event of a total infrastructure failure or where the network record server goes off-line or is otherwise unavailable for recording, the system may be unable to guarantee delivery of the data to be recorded. This is particularly problematic for those systems in which there is not another available record server, or where a backup server is available but is unable to meet the excess demand caused by the failure.

SUMMARY

The present invention pertains to systems and methods for recording call sessions over a telephony network using a desktop recording architecture. An illustrative system for recording call sessions over a telephony network comprises one or more user telephone stations equipped with a telephone and computer desktop including a desktop recording service configured for recording call sessions, one or more additional record services or record servers configured for recording call sessions conducted over the telephone, a means for directing call sessions from a caller to the user telephone station, a means for monitoring the health or status of the desktop recording service and the one or more record services or record servers during an active call session, and a means for communicating a call status of the call session to the desktop recording service and the one or more additional record services or record servers for capturing and preserving a recording of the active call session. The desktop recording service can be configured to operate as either a primary or backup recording service, and, in some embodiments, is used to provide temporary storage of recorded call sessions.

An illustrative method of recording call sessions over a telephony network includes receiving a request to record an inbound or outbound call session between two or more parties, assigning the recording of the call session to a desktop recording service associated with a telephone used to handle the call session, assigning one or more record services or record servers to record the call session, prompting the telephone to transmit voice data or sniffing voice data by the desktop recording service and recording the voice data on the desktop recording service or another device in communication with the desktop recording service, monitoring the health or status of the desktop recording service during the recording of the call session, and transmitting the voice data to the record service or record server. In some embodiments, the voice data can be transmitted to each assigned record service or record server subsequent to the recording of the call session, allowing the recorded call session to be uploaded from the desktop to the record service or record server at a later time when network demand may be lower and/or over a period of time to minimize network traffic. In other embodiments, the voice data is transmitted to a record service or record server simultaneously with the recording of the voice data by the desktop recording service.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
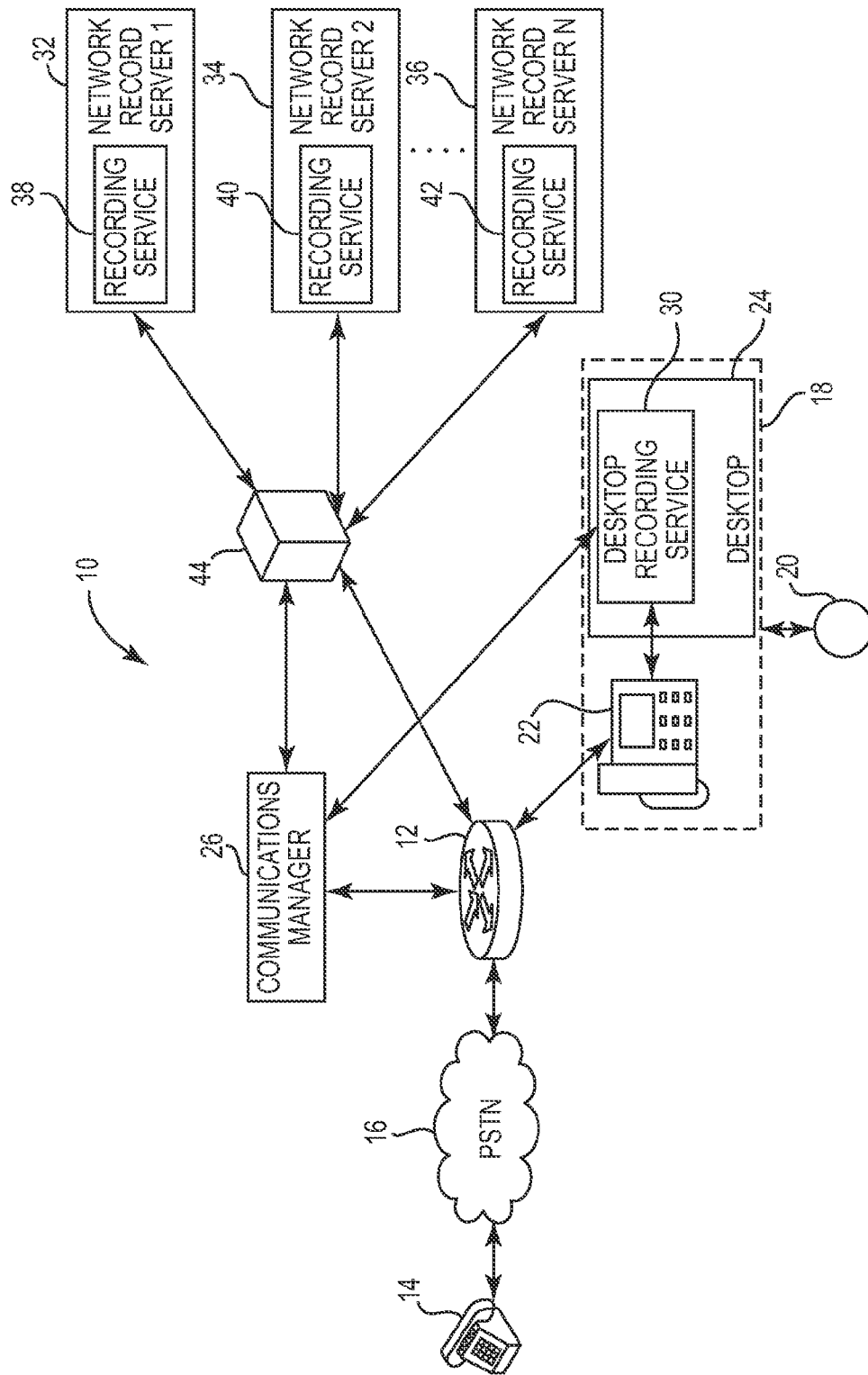
FIG. 1 is a schematic view of an illustrative system for recording call sessions over a telephony network using a desktop recording architecture.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic view of an illustrative system 10 for recording call sessions over a telephony network using a desktop recording architecture. The system 10, illustratively an IP telephony system for recording telephone call sessions made over a Voice over Internet Protocol (VoIP) network, includes a router or gateway 12 that routes calls from a caller 14 via a Public Switched Telephone Network (PSTN) 16 to a telephone station 18 for handling by an individual or multiple individuals 20. The telephone station 18 may comprise, for example, a VoIP-enabled telephone 22 and computer desktop 24 that can be used by an individual 20 to communicate with and, as discussed further herein, to record inbound or outbound call sessions with callers 14. In a customer service center environment, for example, the telephone station 18 can comprise a VoIP-enabled telephone 22 and the computer desktop 24 can comprise a desktop or laptop computer that can be used to access information about a caller's 14 account. In certain embodiments, the VoIP telephone 22 can be implemented as a soft phone executing on a computer. In other embodiments, the VoIP telephone 22 can comprise a stand-alone telephone. In use, the equipment associated with each telephone station 18 may be used to carry out voice and data communications with callers 14. In some embodiments, the telephone station 18 may also include video conferencing equipment adapted to obtain video data, which can be recorded along with the voice data for later playback and/or analysis.

Although only a single telephone station 18 is shown in FIG. 1, multiple telephone stations 18 or extensions can be connected to the system 10 for handling call sessions from multiple callers 14. Moreover, although an example telephone station 18 is shown having a particular desktop configuration, the telephone station 18 can have other configurations that include a greater or lesser number of components than that shown. In one embodiment, for example, the telephone station 18 can comprise a soft phone that operates on the computer desktop 24. In another embodiment, the computer desktop 24 can comprise a separate device that is linked to the telephone 22 via either a wired or wireless connection.

A communications manager 26 is configured to send commands to the router or gateway 12 for routing callers 14 to each telephone station 18. For a VoIP network operating in conjunction with a PSTN network 16, for example, the communications manager 26 may comprise a system such as the Cisco Unified Communications Manager (CUCM) or the like, which can communicate with the router or gateway 12 using a suitable protocol such as a Media Gateway Control Protocol (MGCP), which negotiates the voice data streams back and forth between the caller 14 and the telephone station 18. In those embodiments in which audio-visual communications are to occur between the caller 14 and telephone station 18, a suitable multimedia protocol such as H323 or the like may be used by the communications manager 26 to signal and control multimedia content between the caller 14 and the telephone station 18.

In certain embodiments, the telephone 22 can comprise a VoIP telephone having a built-in-bridge (BIB) feature that enables transmission of voice and/or video streams from the telephone 22 to another service, allowing an individual 20 to initiate the recording of a call session with a caller 14 directly from the individual's telephone 22 and/or desktop 24. In some embodiments, for example, an individual 20 may initiate a call session to be recorded by selecting a button or inputting a command on the telephone 22. Alternatively, or in addition, the communications manager 26 may automatically initiate the recording of a call session with a caller 14 based on a business rule or condition from a third-party application (e.g., an enterprise software application), or from a manual request made by another individual 20 from another telephone station 18 and/or desktop 24.

In the embodiment of FIG. 1, the desktop 24 functions as a desktop recording service for recording call sessions with callers 14. As used herein, the term desktop can be comprise any software and/or hardware that can be used by one or more individuals 20 in conjunction with the handling of an inbound or outbound call session with a caller 14. In some embodiments, the desktop 24 can be a logical location on a network such that communications ongoing in relation to the logical location can be targeted and/or a physical location such that communications associated with the individual 20 are targeted. To enable recording of call sessions, the desktop 24 can be associated with a desktop recording service 30, which can be configured to run on the desktop 24 or on another device in communication with the desktop 24. In some embodiments, for example, the desktop recording service 30 can comprise a software program and/or hardware that operates over the desktop 24. In other embodiments, the desktop recording service 30 can comprise a software program and/or hardware that operates on a separate (e.g., remote) device that communicates with the desktop 24. Other configurations are also possible.

The desktop recording service 30 can include one or more permanent and/or temporary storage services for storing voice data, and in some embodiments also video, screen capture, and/or additional call session data captured by the telephone station 18. The desktop recording service 30 may include, for example, one or more magnetic or optical storage services for storing voice data as well as other call data associated with recorded call sessions. An example of call data that can be associated with each recorded call session can include service data point (SDP) information from a user's telephone station 18 such as caller ID, directory number (DL), service name (e.g., MAC address), line display name, near-end/far-end data, etc. Other information such as time/date stamp information and metadata can also be associated with each recorded call session The desktop 24 and/or desktop recording service 30 can also include various other functionality, including, but not limited to, enterprise business applications, instant messaging, browsing, chat, message boards, and/or email capabilities.

The desktop recording service 30 is configured to facilitate the routing and recording of call sessions, either as a primary recording service or as a secondary or backup service. The desktop recording service 30 can comprise, for example, a software program operable on the computer desktop 24 for establishing and managing communications between the router or gateway 12, the telephone 22, the communications manager 26 as well as one or more network record servers 32,34,36.

To enable recording at the desktop level, the desktop recording service 30 can be configured to receive both incoming and outbound voice data from the user's telephone 22 and then writes this voice data to the desktop recording service 30. In some embodiments, the voice data can be in the form of RTP data streams or the like. The configuration of the desktop recording service 30 can be accomplished, for example, by running a setup routine on the desktop 24 to enable the desktop recording service 30 to record call sessions, or by querying the communications manager 26 to determine if the telephone 22 connected to the desktop 24 includes a built-in-bridge feature capable of receiving voice data (e.g., RTP voice data) from the telephone 22. If the telephone 22 is already configured for recording, the desktop recording service 30 may still connect to a computer telephony integration (CTI) service, but would only record a call session when directed by the communications manager 26 via a Session Initiated Protocol (SIP) message to record the call session. In some embodiments, the desktop recording service 30 records the call session even though it was not directed by the communications manager 26. In this instance, desktop recording service 30 is recording the call session as a secondary or backup method of preserving the recording in case a failure occurs with the primary recording service. In some embodiments, the desktop recording service 30 can also be configured to record video and/or screen data associated with the desktop 24 when a request to record voice data is initiated by the communications manager 26.

The system 10 further includes one or more additional record servers 32,34,36 each configured to operate over a network such as a WAN, LAN, or VLAN for recording call sessions between the user telephone station 18 and callers 14. In some embodiments, for example, the network record servers 32,34,36 can be tasked to record audio and/or video packets in the event of a failure or overflow error in the desktop recording service 30, an interruption in the communication between the telephone 22 and the desktop 24, and/or in the event the user's telephone station 18 is not equipped with its own desktop recording service 30. As an example, the network record servers 32,34,36 can be tasked to record call sessions in those instances where there is no computer desktop 24 associated with an individual's telephone 22, or where for security reasons it is not desired to record the call session on the desktop recording service 30.

Each of the network record servers 32,34,36 can be associated with a network recording service 38,40,42 that establishes and manages data communications across the network. The network recording services 38,40,42 may comprise, for example, software programs operable on the network record servers 32,34,36 or another service connected to the network record servers 32,34,36. Although each network record server 32,34,36 can include a corresponding network recording service 38,40,42, in other embodiments a single network recording service can be configured to control multiple network record servers 32,34,36. In use, the network recording services 38,40,42 allow one or more of the network record servers 32,34,36 to subscribe to a particular call session to determine if the call session has ended, or alternatively determine whether the call has been placed on hold and is expected to continue. This allows the network recording services 38,40,42 to later determine how to handle file management associated with recorded call sessions.

A CTI/SIP proxy service 44 is configured to monitor the health or status of each of the desktop recording services 30 and the network record servers 32,34,36. The CTI/SIP proxy service 44 is an intermediate entity or interface that facilitates communications between the communications manager 26, the desktop recording services 30, and the network record servers 32,34,36. The CTI/SIP proxy server 44 may comprise, for example, a software application and/or hardware that directs RTP streams from each user telephone station 18 to the corresponding desktop recording service 30 and/or to the network record servers 32,34,36, and which manages CTI/SIP sessions between the desktop recording services 30, the communications manager 26, and the network record servers 32,34,36. As an example, the CTI/SIP proxy service 44 may determine which network record server 32,34,36 and/or desktop recording service 30 should record a particular call session based on configuration information stored in a file or database.

In some embodiments, the desktop recording service 30 comprises the primary service for recording call sessions over the system 10. To reduce network bandwidth usage across the router or gateway 12, for example, the system 10 can be configured to route call sessions to the desktop recording service 30 for recording. During a call session, the desktop recording service 30 can be configured to sniff RTP streams received and transmitted back and forth between the telephone 22 and caller 14, allowing the desktop recording service 30 to record the call session without placing any additional load on the network. This may also be useful if the telephone 22 does not have the ability to route packets directly such as that performed, for example, by a telephone having a built-in-bridge (BIB) feature. Recording call sessions in this manner helps to reduce network traffic, thus increasing the bandwidth available for other services to operate over the network. Call sessions previously recorded on the desktop recording services 30 can then be transmitted to the network record servers 32,34,36 at a later time when system demand is relatively low such as during non-business or overnight hours.

The network record servers 32,34,36 can also be tasked to record call sessions in tandem with the desktop recording services 30 to ensure the uninterrupted recording of call sessions in the event of an infrastructure failure in one of the desktop recording services 30. The call session recorded on the desktop recording service 30 can then be deleted upon confirmation that the network record server 32,34,36 successfully recorded the call session, thus eliminating the need to upload or preserve the recording. The file management of recorded call sessions can also be managed in accordance with configuration information provided by the communications manager 26, the desktop recording service 30, the CTI/

SIP proxy service 44, the network recording services 38,40, 42, and/or one or more other system components.

Figure 2:
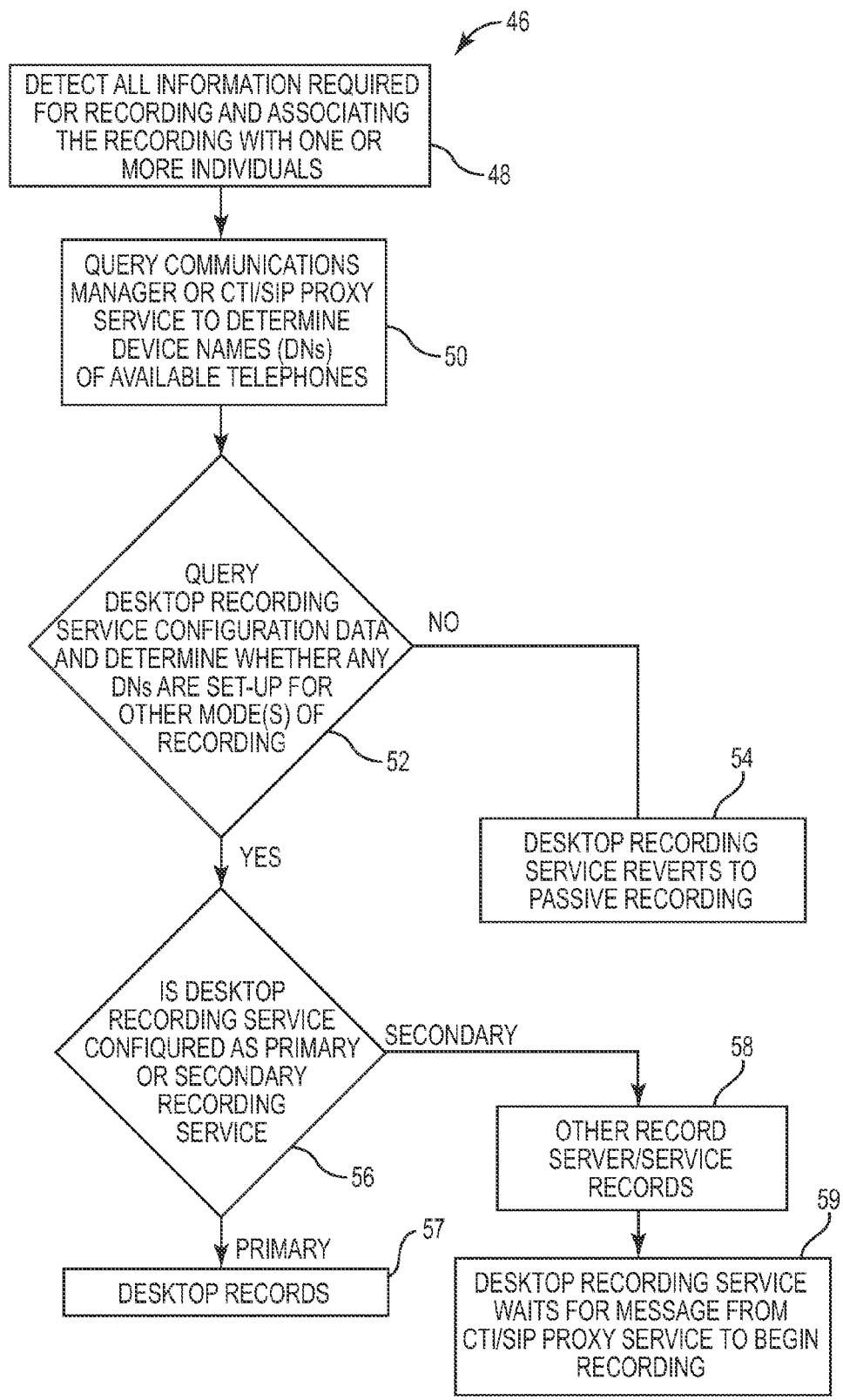
FIG. 2 is a flow diagram showing an illustrative method of configuring a desktop recording service for recording call sessions over the system of FIG. 1.

FIG. 2 is a flow diagram showing an illustrative method 46 of configuring the desktop recording service 30 for recording call sessions. FIG. 2 may represent, for example, several illustrative steps used to configure a user's computer desktop 24 to function as either a primary or secondary recording service over the illustrative system 10 of FIG. 1 or another system in which one or more additional record services or record services are to be tasked for recording call sessions. As indicated generally at block 48, the desktop recording service 30 is configured to detect all information required for recording and associating the recording with one or more individuals 20 that use the telephone station 18. In some embodiments, for example, this may include detecting a media access control (MAC) address as well as determining information about an individual's 20 credentials. Based on this collected information, the desktop recording service 30 queries the communications manager 26 and/or CTI/SIP proxy service 44 to determine the service names (DNs) of the telephones 22 available on the system 10 (block 50) for recording purposes. Once the DNs are obtained, the desktop recording service 30 then queries its own configuration data to determine whether any DNs are setup for other modes of recording such as, for example, network or switched port analyzer (SPAN) recording (block 52). If at block 52 none of the user telephone's DNs are configured for other modes of recording, then the desktop recording service 30 can be configured to revert to a passive mode of operation (block 54) in which the recording of call sessions is performed entirely at the desktop level based on CTI or similar events associated with a call session.

If a service is configured for another mode of recording (e.g., network or SPAN recording), the desktop recording service 30 may then read its own configuration information to determine if the desktop recording service 30 is configured as a primary recording service or as a secondary/backup service (block 56). If at block 56 the desktop recording service 30 is configured as a primary recording service, then the service 30 can be configured to record the call session when prompted (block 57). Otherwise, if the desktop recording service 30 is configured as a secondary recording service, then other record service or record server assigned to record the call session (e.g., one of the network record servers 32,343,6) can be configured to record the call session when prompted (block 58), and the desktop recording service 30 may wait for a CTI or similar event message from the CTI/SIP proxy service 44 to determine when to begin recording a call session (block 59) If, for example, the DN for a network record server 32,34,36 is configured for network recording, then the desktop recording service 30 may await for a CTI or similar event message from the CTI/SIP proxy service 44 to begin recording. In such case, the desktop recording service 30 may register for events for that service, but would use CTI or similar events to determine when to begin recording.

Figure 3:
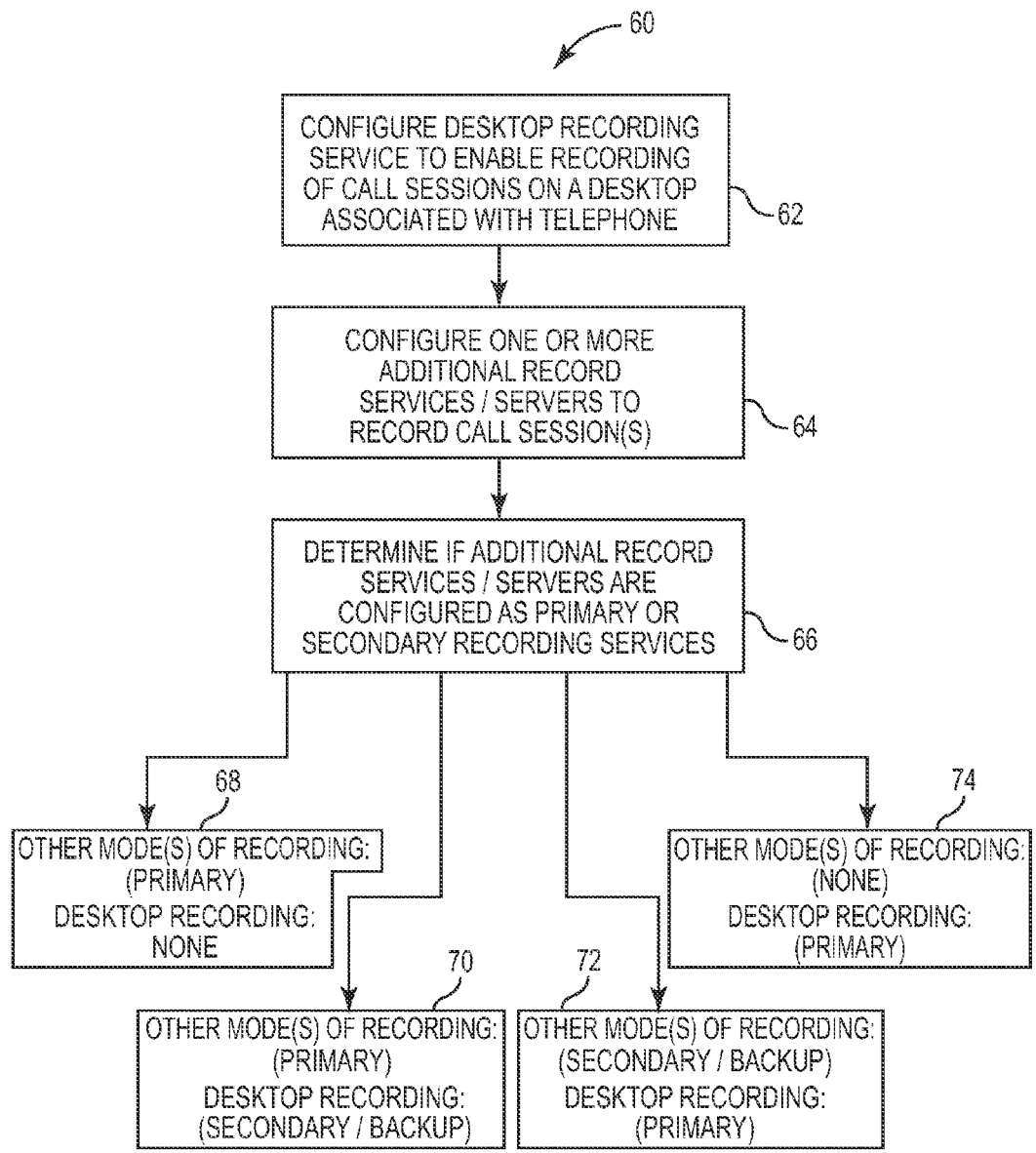
FIG. 3 is a flow diagram showing an illustrative method for configuring those services to be recorded as either primary or backup recording services.

FIG. 3 is a flow diagram showing an illustrative method 60 for configuring those services that are to be recorded as either primary or backup recording services. The method 60 may represent, for example, several illustrative steps used for configuring the desktop recording service 30 and the network recording services 38,40,42 of system 10 to operate as primary or backup recording services. Although the method 60 is described herein with respect to the configuration of a single desktop recording service 30 to operate as either a primary or backup recording service, it should be understood that the method 60 can be employed to task multiple desktop recording services 30 to operate in conjunction with one or more of the network recording services 38,40,42 and/or with one or more other record services or record servers. In some embodiments, for example, the method 60 could be used to configure multiple desktop recording services 30 to operate as either a primary or backup recording service in conjunction with one or more other network, SPAN, or desktop recording devices provided as part of a call recording system.

As shown in FIG. 3, the method 60 can include configuring a desktop recording service 30 to enable the recording of call sessions on a computer desktop 24 associated with a user's telephone 22 (block 62). At block 64, the method 60 further includes configuring one or more additional recording services or record servers (e.g., network services 38,40,42) to record call sessions. For services that are configured to be recorded via network recording, for example, the network recording services 38,40,42 may determine whether they are configured to handle recording of call sessions as either the primary recording services or as secondary or backup recording services (block 66). In some embodiments, recording via the network record services 38,40,42 and the desktop recording service 30 can be accomplished based on one of the following four recording modes shown in Table 1 below:

TABLE 1

| (Recording Modes) | | |
|---|---|---|
| Recording Mode | Other Mode(s) of Recording | Desktop Recording |
| 1 | Primary | None |
| 2 | Primary | Secondary/Backup |
| 3 | Secondary/Backup | Primary |
| 4 | None | Primary |

In a first mode of operation (block 68), the desktop recording service 30 is disabled, and the recording of call sessions occurs only via another mode of recording such as network or SPAN-based recording. For network recording using network recording services 38,40,42, for example, such recording could be accomplished entirely by one of the network record servers 32,34,36. This configuration is similar to existing telephony systems in which recording is performed solely at the network level, and voice data streams from the user's telephone station are directed across the network to a server or network of servers tasked to record call sessions associated with that station.

In a second mode of operation (block 70), one or more services other than the desktop recording service 30 (e.g., one or more of the network recording services 38,40,42) are tasked as the primary recording services and the desktop recording service 30 is tasked as a secondary or backup recording service. In this mode, the network recording services 38,40,42 can be configured to transmit the status of call session recordings to the desktop recording service 30, which acts as a backup in the event of an infrastructure failure, or in the event the network record server 32,34,36 goes off-line or is otherwise unavailable to record the call session. In some embodiments, the desktop recording service 30 always records the call session and determines whether it needs to preserve the recording or delete it. In other embodiments, the desktop recording service 30 may not always record the call session, but only when requested to.

In a third operational mode (block 72), the desktop recording service 30 is configured as the primary service for recording call sessions and the other record services or record servers (e.g., one or more of the network record services 38,40,42) are tasked as secondary or backup recording services. In this mode, the network recording services 38,40,42 await for a CTI or similar event from the communications manager 26 as a result of a SIP redirect or other CTI event to record the call session in the event of a failure of the desktop recording service 30, or when the communications link between the telephone 22 and the desktop 24 is lost or is interrupted. In the event one of the network recording services 38,40,42 receives a CTI or similar event message to begin recording a call session, the service 38,40,42 may then register with the CTI/SIP proxy service 44 and begin recording the full call session or the remainder of the call session. Alternatively, and in other embodiments, the network recording service 38,40,42 may register with the CTI/SIP proxy service 44, and await recording of the call session in the event it receives a CTI or similar event message from the desktop recording service 30.

In a fourth operational mode (block 74), all other record services or record servers are disabled, and the desktop recording service 30 functions as the sole recording service. In this mode, the desktop recording service 30 receives voice data streams directly from the user's telephone 22 (e.g., via a built-in-bridge or other suitable method), and the voice data streams are immediately transmitted to the desktop recording service 30 for recording The configuration of the network recording services 38,40, 42 may vary depending on whether the services 38,40,42 are configured as primary or backup recording services. The desktop recording service 30, the network recording services 38,40,42, and SIP proxies will behave differently depending on which mode of operation the system is operating under.

When desktop recording is set as the primary recording means (block 72), for example, the CTI/SIP proxy service 44 is configured to read a complete list of registered system services to determine where CTI or similar event messages should be directed to. If the primary desktop recording service 30 is not available, the CTI/SIP proxy service 44 sends all CTI or similar events to the network recording services 38,40,42. When a desktop recording service 30 registers a connection to the CTI/SIP proxy service 44 for a certain service (e.g., a particular user's telephone 22), however, the CTI/SIP proxy service 44 can then be configured to direct all future CTI or similar events to the computer desktop 24 associated with that telephone 22. To facilitate transmission of CTI or similar events, the DNs for the telephone 22 can be known ahead of time. In some embodiments, for example, the DNs for each telephone 22 can be stored in a file or database maintained by the CTI/SIP proxy service 44 and/or by the communications manager 26.

To enable network recording in the event the desktop recording service 30 is unable or unavailable to record (e.g., due to a system failure, overflow error, lost connection, etc.), the CTI/SIP proxy service 44 can also be configured to maintain a connection with the desktop recording service 30, allowing the CTI/SIP proxy service 44 to redirect CTI or similar events to a network recording service 38,40,42 associated with the user's telephone 22. This allows the network record server 32,34,36 to immediately begin recording a call session in the event the primary, desktop recording service 30 is unable to continue recording the call session. As an example, if an individual 20 temporarily disconnects their computer desktop 24 from the telephone station 18, the CTI/SIP proxy service 44 would redirect the CTI or similar event to a network recording service 38,40,42 assigned to handle recording of that user's telephone 22. The network recording service 38,40,42 would then direct the voice data streams to the network record server 32,34,36 to continue recording the call session until completion, or until at such point the desktop recording service 30 is available again for recording the call session. In some embodiments, the network recording services 38,40,42 always record the call sessions and determine whether they need to preserve the recording or delete it. In other embodiments, the network recording services 38,40, 42 may not always record the call session, but only when requested to.

The network and desktop recording services 30,38,40,42 are configured to read a list of supported services and the mode in which they record in as well as the network recording mode (i.e., primary or secondary). When operating in a primary or secondary recording mode, the network and desktop recording services 30,38,40,42 are configured to register with the CTI/SIP proxy service 44 to receive CTI or similar events from the telephone 22 and/or communications manager 26. The CTI/SIP proxy service 44, in turn, can be configured to direct call sessions to both the desktop recording service 30 as well as to each assigned network recording service 38,40,42. In some embodiments, the network recording service 38,40, 42 only begins recording when it receives a CTI or similar event from the CTI/SIP proxy service 44. In some embodiments, the desktop recording service 30 only begins recording when it receives a CTI or similar event from the CTI/SIP proxy service 44.

The desktop recording service 30 is configured to register with the appropriate CTI/SIP proxy service 44 information so that it is ready to receive CTI or similar events via the CTI/SIP proxy service 44. The desktop recording service 30 may also register to receive CTI or similar events from the CTI/SIP proxy service 44. In some embodiments, the desktop 24 is configured to only record a call session when it receives CTI or similar events from the CTI/SIP proxy service 44. During operation, the desktop recording service 30 maintains a close connection with the CTI/SIP proxy service 44 such that, in the event the desktop recording service 30 is unavailable or is unable to record the call session, the associated network record service 38,40,42 is immediately sent a CTI or similar event to begin recording. In some embodiments, desktop recording service 30 may not require notification to record since it will already be recording call sessions in tandem with the network recording service 38,40,42.

The network recording service 38,40,42 is configured to register with the appropriate CTI/SIP proxy service 44 information so that it is ready to receive CTI or similar events via the CTI/SIP proxy service 44. The network recording service 38,40,42 may also register to receive CTI or similar events from the CTI/SIP proxy service 44. In some embodiments, the network recording service 38,40,42 is configured to only record a call session when it receives CTI or similar events from the CTI/SIP proxy service 44. During operation, the network recording service 38,40,42 maintains a close connection with the CTI/SIP proxy service 44 such that, in the event the desktop recording service 30 is unavailable or is unable to record the call session, the associated desktop recording service 30 is immediately sent a CTI or similar event to begin recording. In some embodiments, the network recording service 38,40,42 may not require notification to record since it will already be recording all call sessions in tandem with the desktop recording service 30.

The desktop recording service 30 is configured to register with the CTI/SIP proxy service 44 for the telephone 22 it is attached to, and based on whether the recording method is set for desktop, network, SPAN or other method of recording. If the telephone 22 is configured for network recording and the desktop recording service 30 is configured for backup recording, the desktop recording service 30 transmits a message to the network recording service 38,40,42 indicating that it is registered as a backup. The desktop recording service 30 also maintains a connection with the network recording service 38,40,42 and CTI/SIP proxy service 44 in the event network recording becomes unavailable. In some embodiments, the desktop recording service 30 can be configured to record each call session based on a CTI or similar event, and maintains a copy of the recorded call session only if not prompted by the network recording service 38,40,42 to delete the recording.

Figure 4A:
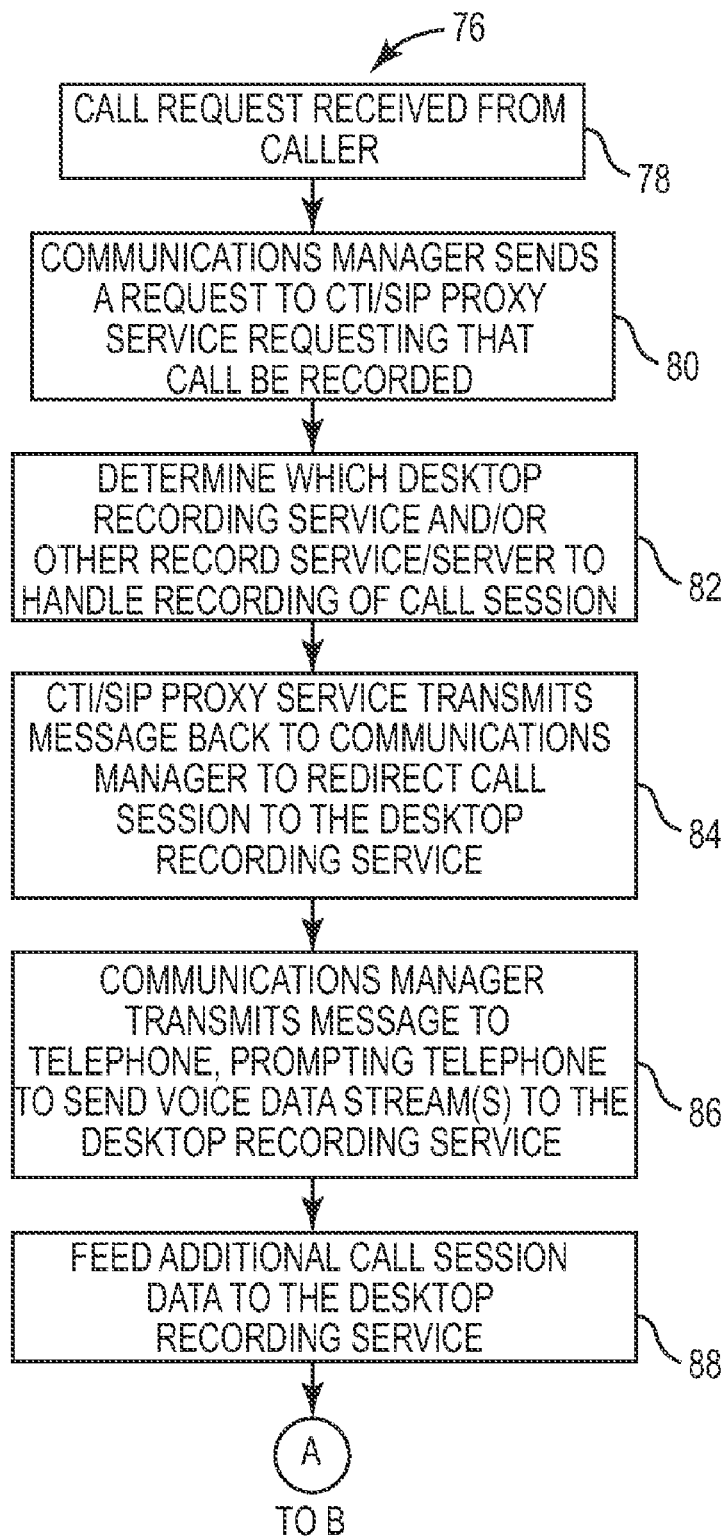
FIGS. 4A-4B is a flow diagram showing an illustrative method of recording a call session over a telephony network in which a desktop recording service is configured for primary recording and one or more additional record services or record servers are configured for secondary or backup recording.
Figure 4B:
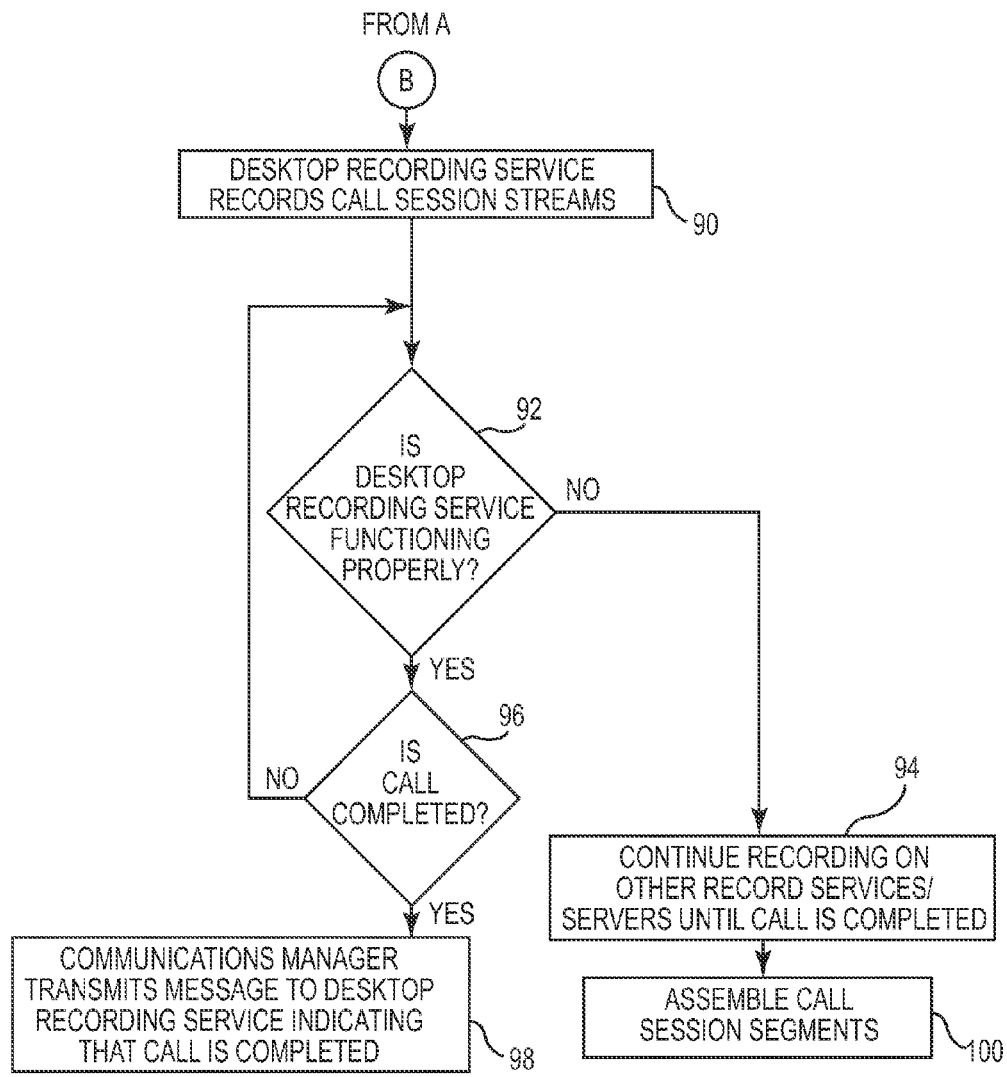

FIGS. 4A-4B is a flow diagram showing an illustrative method 76 of recording a call session over a telephony network using the illustrative system 10 of FIG. 1, wherein the desktop recording service 30 is configured for primary recording and one or more other additional record services or servers (e.g., network recording services 38,40,42) are configured for secondary or backup recording. The method 76 may begin generally at block 78, in which a call request is received from a caller 14 to be recorded. When a call session starts, the communications manager 26 sends a request to the CTI/SIP proxy service 44 requesting that the call be recorded (block 80). The CTI/SIP proxy service 44 may then determine which desktop recording service 30 and/or other record server 32,34,36 to assign for handling the recording of the call session (block 82). When the desktop recording service 30 is set as the primary recording service and the network record servers 32,34,36 are configured to operate as a secondary or backup service, for example, the CTI/SIP proxy service 44 may transmit a message back to the communications manager 26 informing the communications manager 26 to direct the call session for recording to the desktop recording service 30 (block 84). Otherwise, if the other record servers 32,34,36 are configured as the primary recording means, the CTI/SIP proxy server 44 transmits a message back to the communications manager 26 prompting the communications manager 26 to direct the call session for recording to one of the other record servers 32,34,36.

Once the desktop recording service 30 responds with a message indicating that it is ready for recording, the communications manager 26 then sends a CTI or similar event message to the telephone 22 prompting the telephone 22 to send voice data streams (e.g., RTP streams) to the desktop recording service 30 (block 86). The voice data streams can include both a telephone user voice data stream and the caller voice data stream in order to record both incoming and outgoing voice data. In those embodiments in which the telephone station 18 further includes videoconferencing and/or screen capturing capabilities from the user's computer desktop 24, the response from the desktop recording service 30 may also prompt the telephone station 18 to feed additional call session data such as video data and/or screen data to the desktop recording service 30 for recordation along with the voice data (block 88). If, for example, the telephone station 18 is equipped for videoconferencing with the caller 14, the desktop recording service 30 may transmit a response to the user telephone station 18 prompting the station 18 to provide video data to the desktop recording service 30 along with the voice data streams.

The desktop recording service 30 then records the call session streams (block 90). During recording, the CTI/SIP proxy service 44 is configured to monitor the health and status of the desktop recording service 30 (block 92). In the event of a failure or error with the desktop recording service 30, the other recording service 38,40,42 designated as a secondary or backup service for recording receives a CTI or similar event, causing one or more designated record servers 32,34,36 to continue recording the call session until the call session is completed (block 94). In some embodiments, the network or SPAN record servers tasked as the secondary or backup servers are notified to preserve recording.

If at block 96 the call session is complete, the communications manager 26 transmits a message to the desktop recording service 30 indicating that the call session has completed (block 98). In some embodiments, for example, the communications manager 26 transmits a CTI or similar message prompting the desktop recording service 30 to stop recording voice, video, screen, and/or other call session data. If an error occurred during the recording, the segments of the call session recorded on the desktop recording service 30 and the assigned network record server 32,34,36 can then be assembled together (block 100). In some embodiments, for example, the call session segments can be assimilated together in a manner described, for example, in U.S. patent application Ser. No. 12/484,834, entitled Distributed Record Server Architecture For Recording Call Sessions Over a VoIP Network," the contents of which are incorporated herein by reference in their entirety for all purposes.

Because the recording of call sessions is done at the desktop level via the desktop recording service 30, there is less RTP traffic on the network since the RTP data streams go up to the router or gateway 12 and are then sent back down to the desktop recording service 30. During recording, this eliminates the need for the RTP data streams to travel across the network, and reduces the number of network record servers that are required since the servers are only tasked as a primary service in the event the telephone station 18 is not equipped with a computer desktop 24 having a desktop recording service 30, or when the desktop 24 is not available or is unable to record. The ability to record call sessions at the desktop level also allows an individual 20 to use a single interface for recording irrespective of whether the recording is performed at the desktop level or via another mode of recording such as over a network or SPAN. Those telephone stations 18 equipped with a computer desktop 24 configured for recording call sessions also permit a user to gain immediate access to call session recordings for review or other purposes instead of having to wait for such recordings to be downloaded to their desktop 24.

Figure 5:
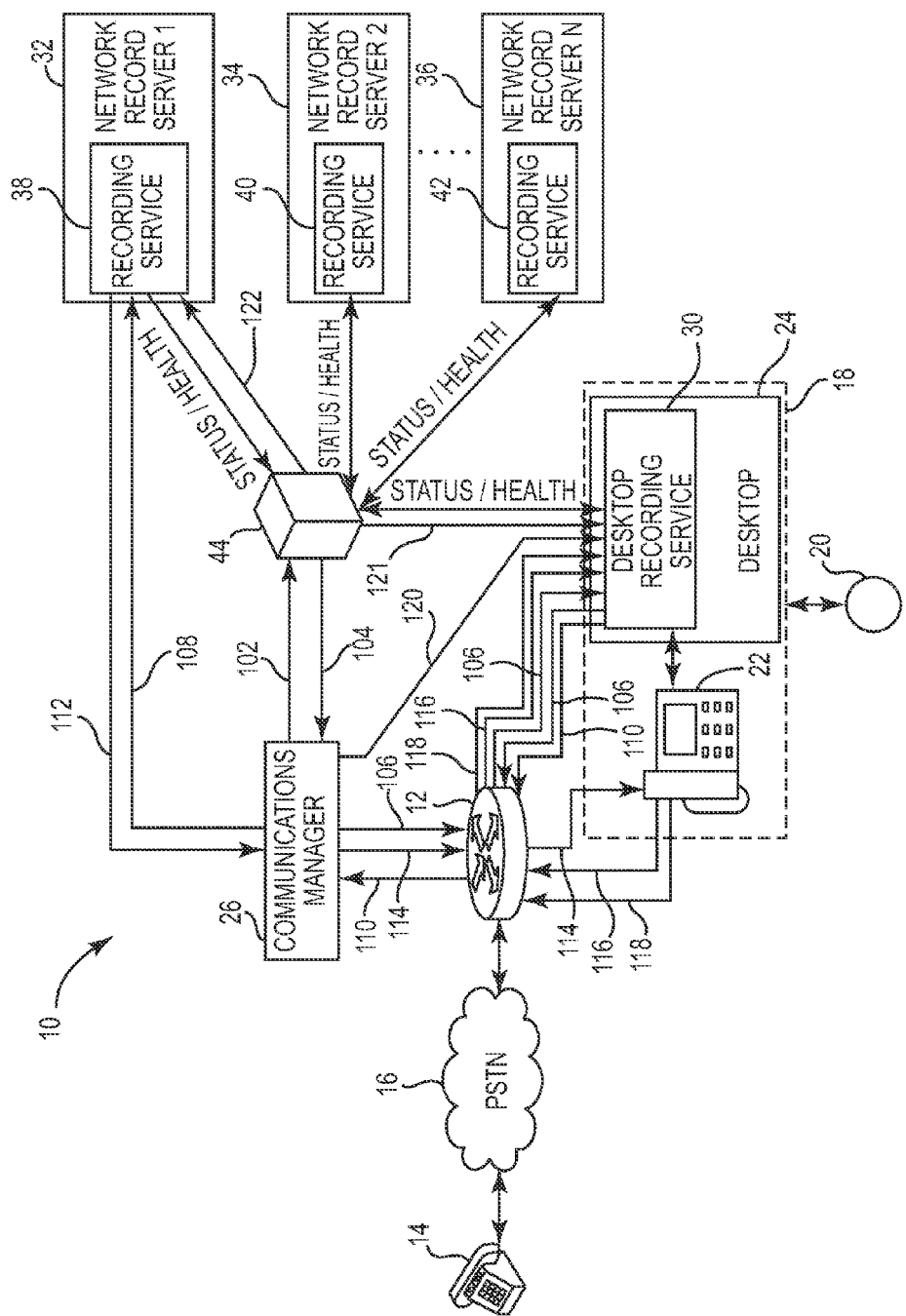
FIG. 5 is a schematic view showing an illustrative implementation of the method of FIGS. 4A-4B using the illustrative system of FIG. 1.

FIG. 5 is a schematic view showing an illustrative implementation of the method 76 of FIGS. 4A-4B using the illustrative system 10 of FIG. 1. As shown in FIG. 5, when a call request is received from a caller 14, the communications manager 26 sends a message 102 to the CTI/SIP proxy service 44, requesting that a call be recorded. The CTI/SIP proxy service 44 then determines which desktop recording service 30 and other record server (e.g., network record server 32) to assign to handle the recording of the call session. With the desktop recording service 30 set as the primary recording service, the CTI/SIP proxy service 44 then transmits a message 104 back to the communications manager 26 informing the manager 26 to redirect the call session for recording to the desktop recording service 30. The communications manager 26 then sends a message 106 to the desktop recording service 30 and a message 108 to the assigned network recording service 38 indicating that the system 10 is to operate with the desktop recording service 30 as the primary recording service and the network record server 32 as the secondary or backup recording service. The desktop recording service 30 and network recording service 38 then transmit messages 110,112 back to the communications manager 26 indicating whether they are available for recording. In some embodiments, a lack of response by the desktop recording service 30 or record server 32 may indicate that an error occurred and that the record service is unavailable for recording.

The communications manager 26 may then send a message 114 to the user's telephone 22 prompting the telephone 22 to send voice data streams to the desktop recording service 30 including both a telephone user 20 voice data stream 116 and a caller 14 voice data stream 118. The user's telephone 22 then directs the voice data streams 116,118 to the desktop recording service 30. Other call session data such as video and/or screen data can also be directed to the desktop recording service 30. When the call session ends, the communications manager 26 transmits a message 120 to the desktop recording service 30, prompting the desktop recording service 30 to stop recording the call session. In some embodiments, the CTI/SIP proxy service 44 may also end the recording of the call session via a message 121.

Throughout the recording, the CTI/SIP proxy service 44 continuously monitors the desktop recording service 30 and the network recording services 38,40,42 to determine the health and/or operational status of each recording service 30 or server 32,34,36. In the event an error is detected during the recording of the call session that would prevent the call session from being fully recorded on the desktop recording service 30, the designated network record server 32 tasked as a secondary or backup service receives a message 122 from the CTI/SIP proxy service 44, causing that network record server 32 to record the remainder of the call session. In such case, the voice data streams 116,118 would be re-routed to the network record server 32 for recording. In some embodiments, the record server 32 is prompted to preserve the recording of the call session.

Figure 6A:
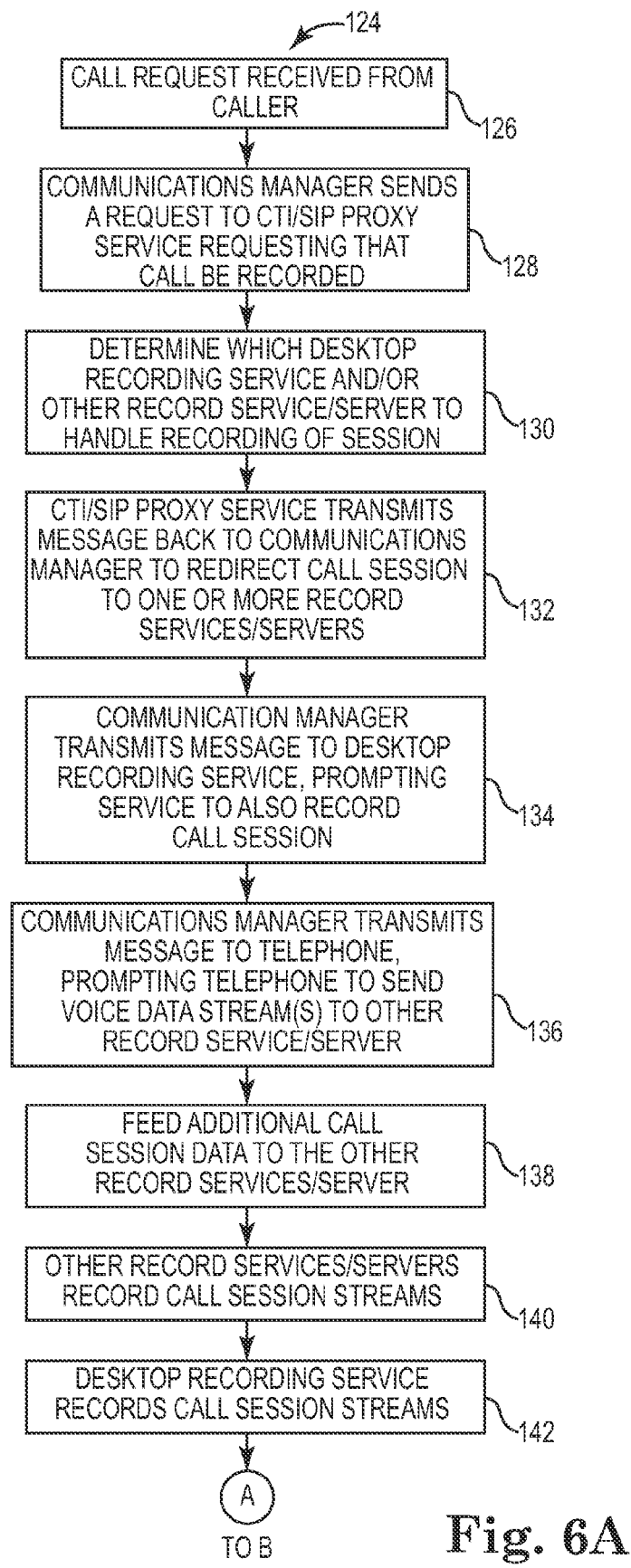
FIGS. 6A-6B is a flow diagram showing an illustrative method of recording a call session over a telephony network in which a desktop recording service is configured for secondary or backup recording and one or more additional record services or record servers are configured for primary recording.
Figure 6B:
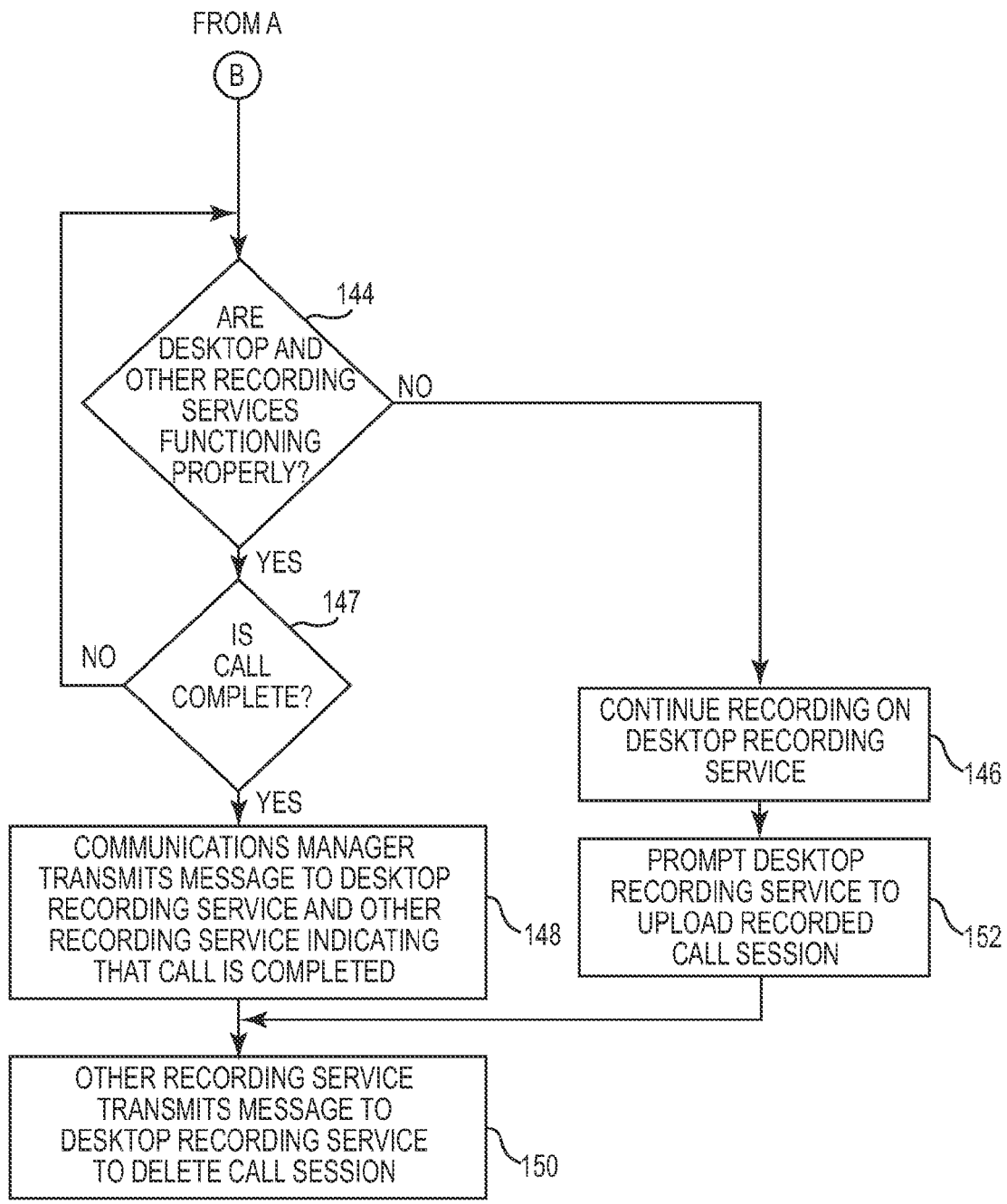

FIGS. 6A-6B is a flow diagram showing an illustrative method 124 of recording a call session over a telephony network using the illustrative system 10 of FIG. 1, wherein the desktop recording service 30 is configured for secondary or backup recording and one or more additional record services or servers (e.g., network recording services 38,40,42) are configured for primary recording. The method 124 may begin generally at block 126, in which a call request is received from a caller 14 to be recorded. When a call request is received, the communications manager 26 sends a request to the CTI/SIP proxy service 44 requesting that the call be recorded (block 128). The CTI/SIP proxy service 44 may then determine which desktop recording service 30 and/or other record server 32,34,36 to assign for handling the recording of the call session (block 130). When the network record servers 32,34,36 are set as the primary recording services and the desktop recording service 30 is configured to operate as a secondary or backup service, for example, the CTI/SIP proxy service 44 may transmit a message back to the communications manager 26 prompting the manager 26 to redirect the call session for recording to one or more of the other record services or record servers (block 132). In some embodiments, the communications manager 26 may further transmit a message to the desktop recording service 30 to also record the call session simultaneously with the assigned record server 32,34, 36 (block 134).

Once the recording service 38,40,42 responds with a message indicating that it is ready for recording, the communications manager 26 sends a message to the user's telephone 22 prompting the telephone 22 to direct voice data streams (e.g., RTP streams) to the designated record server 32,34,36 (block 136). The voice data streams can include both a user voice data stream and the caller voice data stream in order to record both incoming and outgoing voice data. In those embodiments in which the telephone station 18 further includes videoconferencing and/or screen capturing capabilities from the user's computer desktop 24, the response from the recording service 38,40,42 may also prompt the user telephone station 18 to feed video data to the record server 32,34,36, and in some cases further to the desktop recording service 30, for recordation along with the voice data (block 138). If, for example, the user's telephone station 18 is equipped for videoconferencing with the caller 14, the recording service 38,40,42 may transmit a response to the telephone station 18 prompting the station 18 to provide video and/or screen data to the network record server 32,34,36 along with the voice data streams.

The assigned record server 32,34,36 then records the call session streams (block 140). In those embodiments in which the desktop recording service 30 is further configured to record the call session in tandem with the recording server 32,34,36, the desktop recording service 30 may further record the call session streams (block 142). During recording, the CTI/SIP proxy service 44 is configured to monitor the health and status of the network recording service 38,40,42 and the desktop recording service 30 (block 144). If the desktop recording service 30 is configured to record the call session in tandem with the network record server 32,34,36, then the CTI/SIP proxy service 44 may transmit a CTI or similar event to the desktop recording service 30, causing the desktop recording service 30 to begin recording the call session (block 146).

If at block 147 the call session is complete, the communications manager 26 transmits a message to the recording services 30,38,40,42 indicating that the call session has completed (block 148). If the network record server 32,34,36 successfully records the entire call session, the recording service 38,40,42 transmits a message to the desktop recording service 30 prompting the service 30 to delete the recorded call session from the desktop recording service immediately (block 150). In some embodiments, upon completion of the call session recording, the network recording service 38,40, 42 may determine if the recording was completed correctly and if so, transmit a message at a later time to the desktop recording service 30 prompting the recording to be deleted.

If the recording did not record completely, or if an error occurred during the course of the recorded call session, the network recording service 38,40,42 can be configured to prompt the desktop recording service 30 to upload its version of the recording to the network recording server 32,34,36 (block 152). Alternatively, If the desktop recording service 30 is not directed to delete the call session recording, the desktop recording service 30 can be configured to automatically send a version of the recorded call session to the network record server 32,34,36 at a later time such as at the end of the day or overnight. Once uploaded, the prior, incomplete version of the recorded call session can then be deleted from the network recording server 32,34,36.

Figure 7:
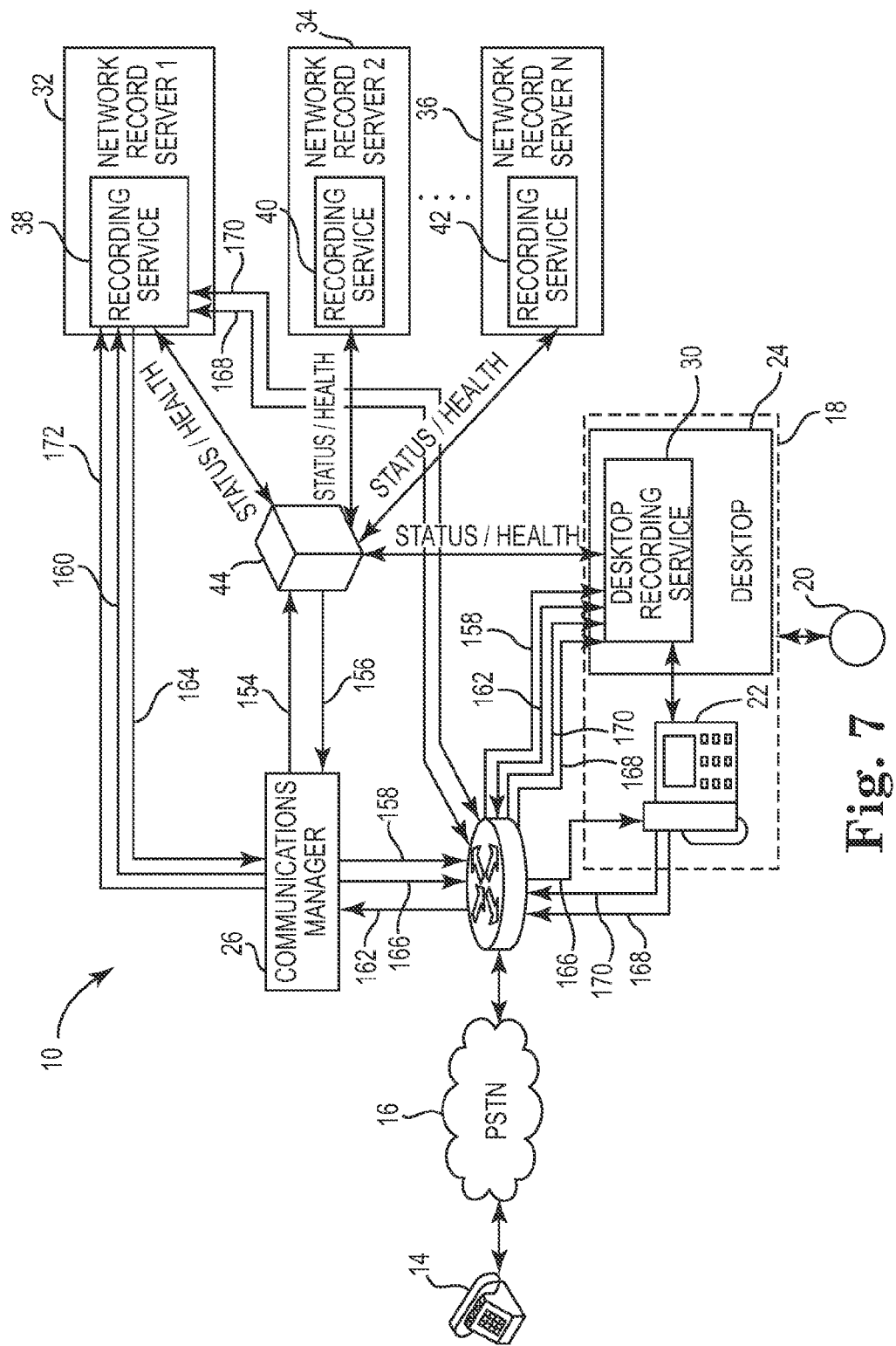
FIG. 7 is a schematic view showing an illustrative implementation of the method of FIGS. 6A-6B using the illustrative system of FIG. 1.

FIG. 7 is a schematic view showing an illustrative implementation of the method 124 of FIGS. 6A-6B over the illustrative system 10 of FIG. 1. As shown in FIG. 7, when a call request is received from a caller 14, the communications manager 26 sends a message 154 to the CTI/SIP proxy service 44, requesting that a call be recorded. The CTI/SIP proxy service 44 then determines which desktop recording service 30 and other record service or record server (e.g., network record server 32) to assign to handle the recording of the call session. With a network recording service 38 set as the primary recording service, the CTI/SIP proxy service 44 then transmits a message 156 back to the communications manager 26 informing the manager 26 to redirect the call session for recording to the network record server 32, and in some embodiments, also to the desktop recording service 30. The communications manager 26 then sends a message 158 to the desktop recording service 30 and a message 160 to the recording service 38 indicating that the system 10 is to operate with a recording service 38 as the primary recording service and the desktop recording service 30 as the secondary or backup service. The desktop recording service 30 and network recording service 38 then transmit messages 162,164 back to the communications manager 26 indicating whether they are available for recording.

The communications manager 26 may then send a message 166 to the user's telephone 22 prompting the telephone 22 to send voice data streams to the network recording server 32 including both a telephone user voice data stream 168 and a caller voice data stream 170. In some embodiments, the voice data streams 168,170 may be combined into one stream. The telephone 22 then directs over the voice data streams 168,170 to the network recording service 38 for recording. In those embodiments in which the desktop recording service 30 is configured to record the call session in tandem with the network record server 32 as a secondary or backup recording service, the desktop recording service 30 may also sniff the voice data streams 168,170 sent by the telephone 22, thus allowing the desktop recording service 30 to also record the call session. When the call session ends, the communications manager 26 transmits a message 172 to the network recording service 38, prompting the service 38 to stop recording the call session. Alternatively, and in other embodiments, the communications manager 26 may transmit the message 172 to the CTI/SIP proxy server 44, which, in turn, directs the message 172 to the appropriate record service 38.

Embodiments of the present invention may be provided as a computer program product, which may include a machine-readable medium having stored thereon instructions that may be used to program a computer (or other electronic services) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for recording call sessions over a telephony network, the system comprising:
    one or more user telephone stations, at least one of the user telephone stations including a telephone and computer desktop, the computer desktop including a desktop recording service configured for recording call sessions conducted over the telephone;
    one or more additional record services or record servers configured for recording call sessions conducted over the telephone;
    a means for directing call sessions from a caller to the at least one user telephone station;
    a means for monitoring the health or status of the desktop recording service and the one or more record services or record servers during an active call session; and
    a means for communicating a call status of the call session to the desktop record service and the one or more additional record services or record servers for capturing and preserving a recording of the active call session.

2. The system of claim 1, wherein the desktop recording service is configured to operate as either a primary or secondary recording service.

3. The system of claim 1, wherein the desktop recording service is configured to operate as a primary recording service for recording a call session, and wherein the one or more addition record services or record servers are configured to record the call session in response to an event from said monitoring means.

4. The system of claim 1, wherein the desktop recording service is configured to operate as a primary recording service for recording the call session, and wherein the one or more additional record services or record servers are configured to simultaneously record the call session with the desktop recording service.

5. The system of claim 1, wherein the one or more additional record services or record servers are each configured to operate as a primary recording service for recording the call session, and wherein the desktop recording service is configured to simultaneously record the call session with the one or more additional record services or record servers.

6. The system of claim 1, wherein the one or more additional record services or record servers are each configured to operate as a primary recording service for recording the call session, and wherein the desktop recording service is configured to record the call session in response to an event from said monitoring means.

7. The system of claim 1, wherein the desktop recording service comprises a recording device.

8. The system of claim 1, wherein the desktop recording service is configured to receive call session data from the telephone and write the call session data to the desktop recording service.

9. The system of claim 1, further including a recording device coupled to the desktop recording service.

10. The system of claim 9, wherein the desktop recording service is configured to receive call session data from the telephone and write the call session data to the recording device.

11. The system of claim 1, wherein the telephone is a stand-alone device coupled to the computer desktop.

12. The system of claim 1, wherein the telephone is a soft phone operable on the computer desktop.

13. The system of claim 1, wherein the desktop recording service comprises a computer software program operable on the computer desktop.

14. The system of claim 1, wherein said means for monitoring the health or status of the desktop recording service and the one or more additional record services or record servers includes a computer telephone interface (CTI) proxy service.

15. A method of recording call sessions over a telephony network, the telephony network including at least one user telephone station including a telephone and computer desktop, the method comprising:
    configuring the computer desktop for operating as a desktop recording service for recording call sessions;
    configuring a server for operating as a record service or record server for recording call sessions;
    directing an inbound or outbound call to the at least one user telephone station;
    monitoring the health or status of the desktop recording service and the record service or record server; and
    receiving call session data associated with the call from the user telephone station and recording the call session data on the desktop recording service.

16. The method of claim 15, wherein the desktop recording service is configured to operate as a primary recording service, and further including transmitting the call session data to the record service or record server for recording the call session in response to an error message received from the desktop recording service.

17. The method of claim 15, wherein the desktop recording service is configured to operate as a secondary recording service, and further including transmitting the call session data to a recording device for recording a backup version of the call session simultaneously with another record service or record server that records the call session data.

18. The method of claim 15, wherein the record service or record server is configured to operate as a secondary recording service, and further including transmitting the call session data to a repository of the record service or record server for recording a backup version of the call session simultaneously with another record service or record server tasked to record the call session.

19. The method of claim 15, wherein receiving call session data from the telephone includes receiving a user voice data stream and at least one additional voice data stream.

20. The method of claim 19, wherein receiving call session data from the telephone further includes additional call session data.

21. The method of claim 20, wherein said additional call session data includes video and/or screen data.

22. A method of recording call sessions over a telephony network, the telephony network including one or more record services or record servers and one or more user telephone stations each including a telephone and computer desktop, the method comprising:
- receiving a request to record an inbound or outbound call session between two or more parties;
- assigning the recording of the call session to a desktop recording service associated with a telephone for handling the call session;
- assigning one or more record services or record servers to record the call session;
- prompting the telephone to transmit voice data or sniffing voice data by the desktop recording service and recording the voice data on the desktop recording service or another device in communication with the desktop recording service;
- monitoring the health or status of the desktop recording service during the recording of the call session; and
- transmitting the voice data to the record service or record server.

23. The method of claim 22, wherein the voice data is transmitted to the record service or record server after the recording of the call session by the desktop recording service.

24. The method of claim 22, wherein the voice data is transmitted to the record service or record server simultaneously with the recording of the voice data by the desktop recording service.

25. A method of recording call sessions over a telephony network, the telephony network including at least one user telephone station including a telephone and computer desktop, the method comprising:
- configuring the computer desktop for operating as a desktop recording service for recording call sessions, wherein the desktop recording service is configured to operate as a secondary recording service;
- configuring a server for operating as a record service or record server for recording call sessions;
- directing an inbound or outbound call to the at least one user telephone station;
- receiving call session data associated with the call from the user telephone station and recording the call session data on the desktop recording service; and
- transmitting the call session data to a recording device for recording a backup version of the call session simultaneously with another record service or record server that records the call session data.

26. A method of recording call sessions over a telephony network, the telephony network including at least one user telephone station including a telephone and computer desktop, the method comprising:
- configuring the computer desktop for operating as a desktop recording service for recording call sessions;
- configuring a server for operating as a record service or record server for recording call sessions;
- directing an inbound or outbound call to the at least one user telephone station; and
- receiving call session data associated with the call from the user telephone station and recording the call session data on the desktop recording service, wherein receiving call session data from the telephone includes receiving a user voice data stream and at least one additional voice data stream.

27. The method of claim 26, wherein receiving call session data from the telephone further includes additional call session data.

28. The method of claim 27, wherein said additional call session data includes video and/or screen data.

* * * * *